(12) United States Patent
DeFelice et al.

(10) Patent No.: US 10,675,684 B2
(45) Date of Patent: Jun. 9, 2020

(54) METAL AM PROCESS WITH IN SITU INSPECTION

(71) Applicant: Hexcel Corporation, Stamford, CT (US)

(72) Inventors: Scott DeFelice, Holyoke, MA (US); Anthony DeCarmine, Lebanon, CT (US)

(73) Assignee: Hexcel Corporation, Stamford, CT (US)

( * ) Notice: Subject to any disclaimer, the term of this patent is extended or adjusted under 35 U.S.C. 154(b) by 536 days.

(21) Appl. No.: 15/496,702

(22) Filed: Apr. 25, 2017

(65) Prior Publication Data

US 2017/0312821 A1   Nov. 2, 2017

Related U.S. Application Data

(60) Provisional application No. 62/329,311, filed on Apr. 29, 2016.

(51) Int. Cl.
*B22F 3/105* (2006.01)
*G01N 21/88* (2006.01)
(Continued)

(52) U.S. Cl.
CPC ........ *B22F 3/1055* (2013.01); *B23K 15/0086* (2013.01); *B23K 20/1215* (2013.01);
(Continued)

(58) Field of Classification Search
CPC ........... B22F 3/1055; B22F 2003/1057; B33Y 10/00; B33Y 40/00; B33Y 50/02;
(Continued)

(56) References Cited

U.S. PATENT DOCUMENTS

2005/0173380 A1   8/2005   Carbone
2015/0061170 A1*  3/2015   Engel .................... B33Y 10/00
                                              264/40.1

FOREIGN PATENT DOCUMENTS

EP         1815936 A1    8/2007
EP         3002109 A1    4/2016
           (Continued)

OTHER PUBLICATIONS

Extended European Search Report Application No. 17168537.3 Completed: Sep. 12, 2017; dated Sep. 20, 2017 14 Pages.
(Continued)

*Primary Examiner* — Kevin E Yoon
*Assistant Examiner* — Ryan L Heckman
(74) *Attorney, Agent, or Firm* — Whitmyer IP Group LLC

(57) ABSTRACT

A system for inspecting a part while said part is produced by additive manufacturing, includes an additive manufacturing apparatus having a build tray, the apparatus being configured to fabricate the part layer-by-layer on the tray; an automated tool holder carrying a tool configured to deposit, add or weld layer-upon-layer of material; the tool holder and tray are configured to move relative to one another along a defined path; and an inspection device attached to the tool holder and configured to scan a layer of material in situ. The tool holder alternately arranges the tool and inspection device in a working position so that the tool holder fixes the tool in the working position for depositing, adding, or welding the layer of material and thereafter the tool holder switches said tool with the inspection device into the working position for scanning and detecting defects in the layer of material.

23 Claims, 6 Drawing Sheets

(51) Int. Cl.
    *G01N 29/04*     (2006.01)
    *G01N 27/90*     (2006.01)
    *B23K 15/00*     (2006.01)
    *B23K 20/12*     (2006.01)
    *B23K 31/12*     (2006.01)
    *B33Y 10/00*     (2015.01)
    *B33Y 40/00*     (2020.01)
    *B33Y 50/02*     (2015.01)
    *B23P 23/04*     (2006.01)
    *B23P 15/00*     (2006.01)

(52) U.S. Cl.
CPC ............ *B23K 31/125* (2013.01); *B23P 15/00* (2013.01); *B23P 23/04* (2013.01); *B33Y 10/00* (2014.12); *B33Y 40/00* (2014.12); *B33Y 50/02* (2014.12); *G01N 21/88* (2013.01); *G01N 27/90* (2013.01); *G01N 29/04* (2013.01); *B22F 2003/1057* (2013.01); *Y02P 10/295* (2015.11)

(58) Field of Classification Search
CPC ............ B23K 15/0086; B23K 20/1215; B23K 31/125; B23P 15/00; B23P 23/04; G01N 21/88; G01N 27/90; G01N 29/04; Y02P 10/295

See application file for complete search history.

(56) References Cited

FOREIGN PATENT DOCUMENTS

| WO | 2015109096 A1 | 7/2015 |
| WO | 2015189600 A2 | 12/2015 |
| WO | WO-2015189600 A2 * | 12/2015 |

OTHER PUBLICATIONS

Japanese Notice of Rejection Application No. 2017-089396 Completed: Mar. 26, 2018 3 Pages.

Translation of Japanese Notice of Rejection Application No. 2017-089396 Completed: Mar. 15, 2018 2 Pages.

* cited by examiner

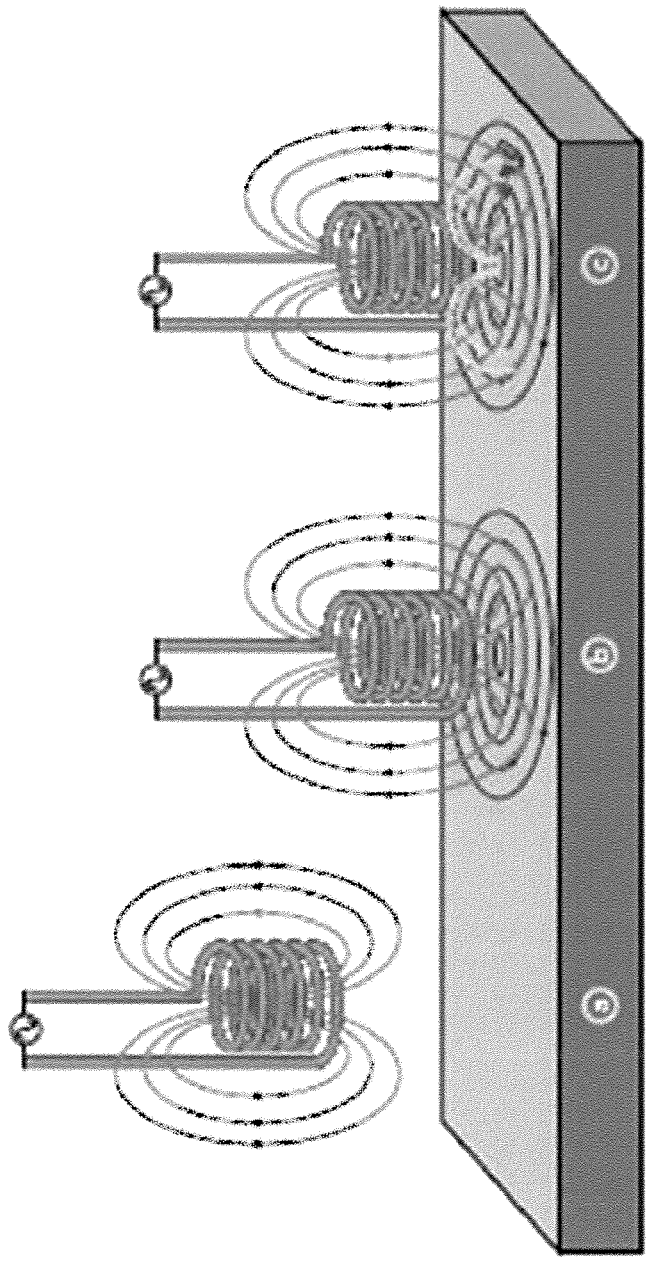

a – The alternating current flowing through the coil at a chosen frequency generates a magnetic field around the coil.
b – When the coil is placed close to an electrically conductive material, eddy current is induced in the material.
c – If a flow in the conductive material disturbs the eddy current circulation, the magnetic coupling with the probe is changed and a defect signal can be read by measuring the coil impedance variation.

FIG. 5

METAL AM PROCESS WITH IN SITU INSPECTION

TECHNICAL FIELD

The present disclosure generally relates to additive manufacturing systems and processes as well as subtractive manufacturing systems and processes involving an additive step, and more specifically relates to systems and processes of additive manufacturing (or systems and processes of subtractive manufacturing involving an additive step) with real-time, on-site automated monitoring and inspection of material layers for detecting defects during a build process.

BACKGROUND

It is known that there are various methods of building three-dimension (3D) objects, including additive manufacturing (AM), subtractive manufacturing (SM) and injection molding (IM). Additive manufacturing (AM), in particular, concerns technologies that synthesize 3D objects by selectively depositing or adding layer-upon-layer of material, whether the material is plastic, metal, concrete or polymer. Different processes of additive manufacturing are, for example, extrusion (e.g., fused deposition modeling, fused filament fabrication), light polymerization (e.g., stereolithography, digital light processing), lamination (e.g., laminated object manufacturing), powder bed (e.g., electron beam melting, selective laser melting, selective heat sintering, selective laser sintering), powder fed (e.g., direct energy deposition), and electron beam fabrication.

A common problem with conventional AM machines and processes involves the uncertainty surrounding the integrity and solidity of each layer formed during the build process. Another problem concerns the integrity and strength in the bonding between neighboring layers of material, i.e., lack of fusion. Other physical defects that are typical in AM processes include porosity, fatigue cracks initiating at pores close to surfaces of the AM part, and surface roughness which has been known to affect fatigue life of the AM part.

A known approach for determining the manufacturing quality of an AM part consists of destructively evaluating a significant number of parts and looking for common defects. However, this approach is costly and time consuming, and negates the benefits of the AM process, such as being able to quickly and cost-effectively produce new and different parts.

There are also nondestructive testing techniques to detect defects in an AM part after the build process has finished. For example, one type of nondestructive testing involves a person holding a handheld instrument adapted for detecting defects in the completed AM part and scanning sections of the AM part for analysis. However, these techniques suffer from drawbacks including the fact that they are not real-time, in-situ processes and thus lack the ability to detect and fix the defects at the time they are created. The defects become inherent in the AM part by the time the entire build process is completed, thereby making it impossible to correct the defects. As a result, the entire AM part must be discarded and a new part made. Such an outcome entails excessive material waste and is costly.

Further, the person may fail to hold the detection instrument steady and scan the AM part along straight paths which are necessary to accurately determine the exact location of defects in the AM part. Thus, imprecise detection of defects may occur. In addition, complex geometries of AM parts also pose a challenge for post-completion nondestructive testing techniques. Many parts made by AM have internal structure that are inaccessible by less geometry-sensitive techniques, such as penetrant testing and magnetic particle testing.

SUMMARY

The needs set forth herein as well as further and other needs and advantages are addressed by the present embodiments, which illustrate solutions and advantages described below.

It is an object of the present teachings to provide an AM inspection system configured for an AM machine (or a SM or IM machine having additive application), and a method of AM inspection, that determines the quality and suitability of an AM part for use.

It is another object of the present teachings to provide a real-time, in-situ inspection system, and a method of inspection, that monitors during the AM build process so that each layer is examined before a subsequent layer is built on top of it. Such a layer-by-layer inspection is beneficial so as to detect defects as early as possible either to minimize cost of scrap material and/or to allow rework in real-time during the AM build process before it is too late to implement changes. It is also another object of the present teachings to provide a real-time, in-situ inspection system, and a method of inspection, that monitors during the AM build process such that defect inspection is performed after every layer is added, after every other layer is added, or after a group/number of successive layers is added, depending on the type of AM process and/or feed material being used. A benefit of inspecting a group of successive layers (e.g., deposit/add/weld three layers, then perform inspection) is that such method provides comprehensive defect analysis without reducing the efficiency of AM production (e.g., time to produce completed part, cost of producing part, energy usage, amount of waste, etc.).

Defects may not be visible (e.g., hidden in the interior of the fabricated product) and/or may be obscured by the AM build process (e.g., devices or components of the AM machine obstructing view) that created them. Accordingly, it is an object of the present teachings to provide a sophisticated inspection system, and a method of inspection, that detects both visible defects and hidden defects.

As many of the AM techniques involve some change to the feed material(s), including consolidation from powder to solid, curing from liquid to solid, it is an object of the present teachings to provide an AM inspection system and method of AM inspection that is nondestructive and non-contact (does not involve direct contact between inspection tools and fabricated product). Such system and method can be electromagnetic (e.g., eddy current), spectral (visual and/or non-visual imaging, spectroscopy, etc.), acoustic (ultrasound, infrasound, etc.), and/or may include other forms of stimulation and/or observation that reveal useful data concerning the porosity, density, crystallography or other salient properties of the AM part. Limitations on use of a specific technology are based on the environments in which the AM processes occupy (e.g., high temperature, vacuum, confinement, etc.).

It is also another object of the present teachings to provide an inspection system, and method of inspection, that not only detects defects in an AM product, but also collects information about each layer of material or each group of successive layers immediately after it is added/cured to determine material properties of the completed AM product. For example, the inspection system provides defect detection, part thickness measurements, and determination of material properties such as elastic moduli.

It is another object of the present teachings to provide an inspection system, and method of inspection, which at least maintains—and thus does not decrease—the stroke utilization of the AM machine. That is, the inspection system incorporated into or with the AM machine minimizes any reduction in usage of CNC (compute numerical control) motion axis. Preferably, the inspection system incorporated into or with the AM machine increases the usage of the CNC motion axis, thereby increasing the size of parts that can be fabricated by the AM machine.

It is also an object of the present teachings to provide an inspection apparatus or unit which can be implemented into an AM system (or SM or IM system having additive application), wherein the inspection apparatus or unit achieves one or more of the above discussed objectives.

These and other objectives are achieved by a real-time, in-situ system for inspecting a part while it is being produced by an additive manufacturing technique, the system comprising: an additive manufacturing apparatus; a tool holder carrying a tool configured to deposit, add or weld layer-upon-layer of material to form the part; a tool placement mechanism to which the tool holder is mounted, the tool placement mechanism and a build table/tray/bed of the additive manufacturing apparatus being configured to provide relative movement therebetween along paths defined by a build program; an inspection device attached to the tool holder, the inspection device configured to scan a layer of the material in situ and detect defects in the layer once the layer is deposited, added or welded; and the tool holder alternately providing the tool and the inspection device in an orientation for use such that the tool holder fixes the tool in a position for depositing, adding or welding the layer of material and thereafter the tool holder switches the tool with the inspection device into a position for scanning and detecting defects in the layer of material.

The system includes an inspection controller which controls operation of the defect inspection process performed by the inspection device. In some embodiments, the inspection controller also actively manages the process of depositing, adding or welding layers performed by the AM apparatus, taking into account the results provided during the defect inspection process. For example, the inspection controller may communicate with the CNC control system of the AM apparatus by transmitting feedback signals regarding the quality and condition of the layer recently added. The CNC control system can then appropriately adjust the AM process to fix the problem or pause the AM process and notify an operator of the defect(s). The inspection controller may be a feedback controller having, for example, a PID (proportional-integral-derivative) architecture. In some cases, the inspection controller uses an adaptive control system or an intelligent control system which learns from the results (e.g., number of defects, location of defects within the AM part) of each inspection run and accordingly adapts the AM build process and/or the inspection process to eliminate, or at least reduce the likelihood of other defects being made during subsequent depositions/additions/welding of layers. For example, the adaptive or intelligent controller may initially configure the inspection tool so that defect inspection is conducted after each layer of material is added. If several layers of material have been added and each layer has produced little (e.g., 2 or 1) to no defects, the controller may adapt and adjust the frequency of inspections (e.g., inspect every other layer; inspect every other 2, 3, 4, etc. layers). Conversely, if the adaptive or intelligent controller has been conducting defect inspection after each group of successive layers is deposited and the number of defects detected has increased, the controller will appropriately adjust so that the frequency of inspection increases (e.g., inspect after each layer is deposited). The controller accordingly provides for more efficient production of high-quality AM parts.

The AM inspection system and method according to the present teachings, as well as an AM inspection apparatus implemented into a conventional AM unit, provide real-time inspection of an AM part as it is being manufactured, which greatly reduces the amount of material that needs to be inspected and enables immediate (real-time, in-situ) correction of manufacturing defects.

BRIEF DESCRIPTION OF THE DRAWINGS

FIG. 5 is a diagram illustrating the AM inspection system shown in FIG. 1 using eddy current probes.

DETAILED DESCRIPTION

Figure 1:
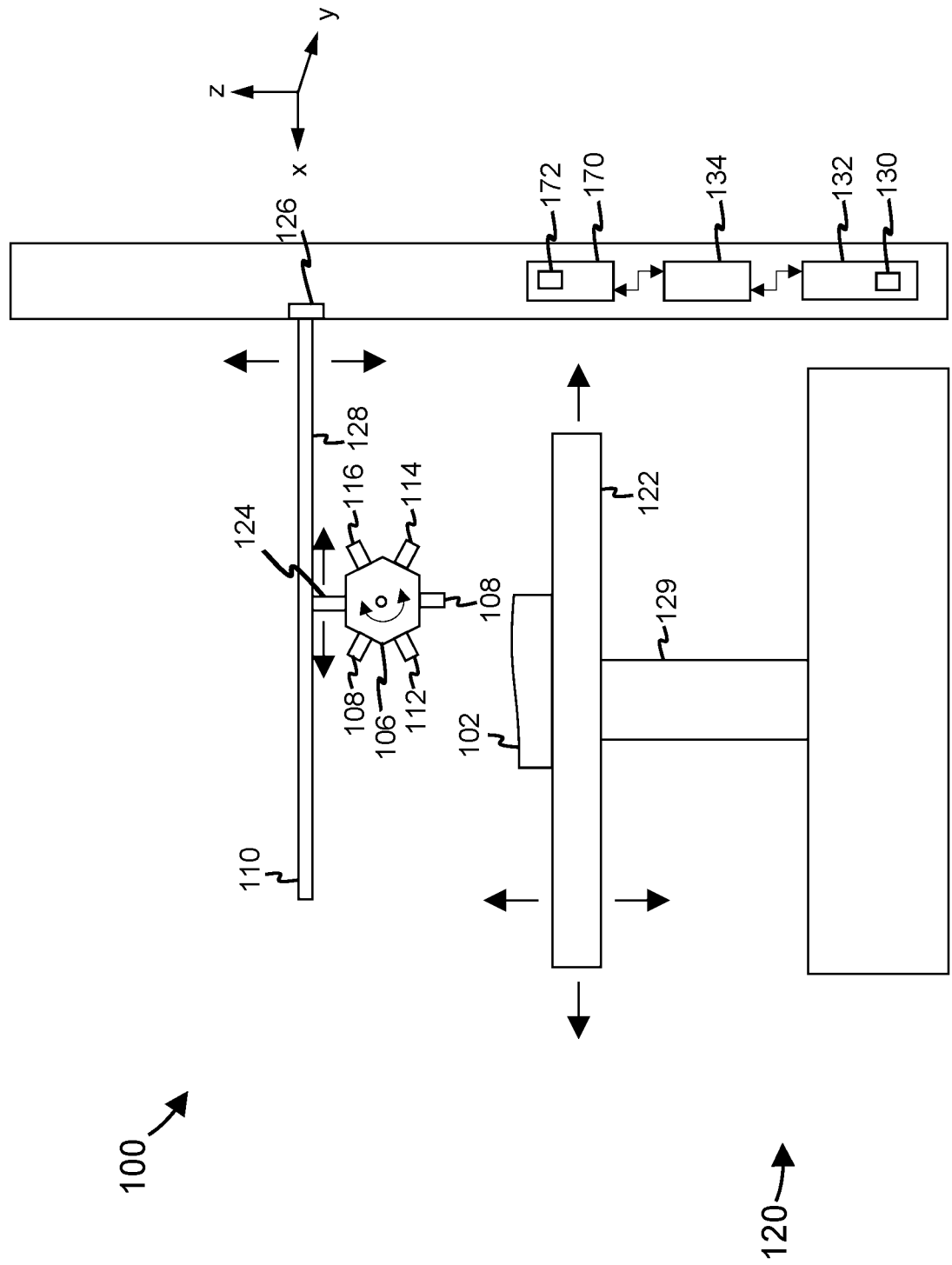
FIG. 1 is a schematic view of an AM inspection system configured for a manufacturing machine (e.g., additive, subtractive/milling, injection molded, or combination thereof) in accordance with the present teachings.

The present teachings are described more fully hereinafter with reference to the accompanying drawings, in which the present embodiments are shown. The following description is presented for illustrative purposes only and the present teachings should not be limited to these embodiments. Any system or controller configuration and architecture satisfying the requirements described herein may be suitable for implementing the AM inspection system and method according to the present teachings.

The simplest of implementations of the present teachings involve the use of prevision AM machines, apparatuses, and mechanisms. Fused Deposition Modeling (FDM, Stratasys), Ultrasonic Consolidation (U/S, Fabrisonic) and electron beam wire feed (EBM wire, Sciaky) are examples of processes that rely on precision machine tools and/or robotic placement of deposition heads to perform the AM process (e.g., selective deposition process). A system according to the present teachings will make use of automated exchangeable tool holders or mounts. For example, the system may be configured to or for an ultrasonic additive manufacturing machine and, make use of the automated exchangeable tool holders. A system according to the present teachings which is adapted for other AM machines could be configured in similar respects.

One advantageous feature of the present teachings is the real-time, in-situ swapping/switching of a deposition tool with an inspection tool without substantially interrupting the AM process. For example, the ultrasonic AM deposit head, after laying down a layer and optionally before or after making planned cuts with a milling tool, switches to an inspection tool. In some embodiments, an eddy current probe is used as the inspection tool, such that the eddy current probe is moved precisely over a recently deposited layer in a scanning pattern to seek response signal deviations that indicate some issue with material continuity (pores, cracks, or kissing bonds). The configuration of the inspection tool with respect to the location of the probe relative to the AM machine base (build table, tray, bed or platform) allows for the exact location(s) of the defect(s) within a layer to be determined.

Eddy current probe is an advantageous detection unit which can inspect a layer of the AM part for potential safety-related or quality-related problems. In addition to crack detection, eddy currents can be used for material thickness measurements such as measuring conductivity, monitoring the effects of heat treatment, and determining thicknesses of coatings/layers of different materials. Eddy current testing can examine large areas very quickly, and it does not require use of coupling liquids. Eddy current testing can also be used to check hardness of the material. In some embodiments, eddy current testing and acoustic (e.g., ultrasonic) testing are used together as complementary techniques, with eddy current having an advantage for quick surface testing and ultrasonics having better depth penetration. In some embodiments of the present teachings, only one inspection tool (electromagnetic, spectral or acoustic) is used. In other embodiments, two or more inspection tools are utilized either simultaneously or in tandem (one after the other). It is to be understood that any combination of inspection tools may be implemented. For example, the inspection tool may comprise an eddy current probe and spectroscope, or alternatively, may comprise a digital camera and an ultrasonic transducer.

In some embodiments of the present teachings, the AM inspection system includes a database which is connected to a controller and the inspection tool. The database collects material property data (e.g., porosity, density, crystallography, conductivity, elastic moduli, etc.) of each layer (or groups of layers) that is inspected and associates the data with the completed AM part so as to create a build/quality assurance record for each individual part. For example, wherein the inspection tool is an eddy current probe, the database saves information concerning crack detection, material thickness measurements, coating measurements, conductivity measurements (heat damage detection, case depth determination), and/or the like. The collection of material property data is also beneficial for maintaining quality control over multiple build/production runs of the same AM part. In some instances, the controller (e.g., adaptive, intelligent, feedback) utilizes the data from previous production runs to adjust the current production run being performed by the AM build apparatus to improve the likelihood that no or minimal defects are created during the present build.

The AM inspection system according to the present teachings may include a tool for attaching or embedding an RFID tag inside the AM part or on an exterior surface of the AM part. The RFID attachment tool may be configured to embed the RFID tag during the AM process or after the entire AM process has completed. The RFID tag contains material property data of the AM part, which may be useful when the part is inspected or analyzed during future maintenance or repair. The RFID tag may also include information regarding the number of defects detected and the extent of repair required to remove the defects. The RFID tag helps to provide a secure and efficient means for transferring relevant material property data along with the AM part. This is in contrast to situations where data stored on paper or on electronic storage (e.g., memory hard drive, server) separately from the relevant part may become lost. For example, if later on a particular AM part fails (e.g., breaks), a quick investigation into the build history of the AM part can be performed by merely scanning the embedded or attached RFID tag and retrieving the information stored therein. In some instances, the tool for attaching or embedding an RFID tag may include, involve, or be part of the layer depositing/adding/welding tool and/or a cutting/milling tool.

Once a defect is detected, the AM part may be scrapped (absent a reworking method) or a routine that recalls a cutting/milling tool may excise a pocket containing the extent of the defect such that the deposition process may refill the pocket and finish the spot rework so as to resemble the balance of the part in process. In alternative embodiments, a routine may be initiated wherein the layer containing the defect is completely removed by a cutting/milling tool, and the depositing/adding/welding tool is subsequently used to repeat application/addition of the removed layer. The reworked pocket or replacement layer may then be inspected again to verify no defects are present.

In some embodiments, the entire layer is first inspected before the cutting/milling tool is used to remove any detected defects. The system according to the present teachings may include a storage or memory unit to save data regarding the exact location of any defects detected in the layer. Once the layer has been completely inspected, the system uses the location data to move the cutting/milling tool into appropriate position to remove each of the defects and further move the deposit tool into appropriate position to rework the layer of material by filling in pockets that were made by the cutting/milling tool. In some cases, if the number of defects exceeds a threshold, the system controls the cutting/milling tool to remove the entire layer and subsequently controls the deposit tool to repeat the step of depositing/adding/welding the replacement layer.

An exemplary embodiment of the present teachings include, but is not limited thereto:

the use of multiple function dedicated actuators which replace the single actuator with tool change capabilities;

the tool placement scheme may be glideway, rotary, hexapod or any other method;

the use of various contact and/or non-contact inspection tools and methods can be utilized—together or separately;

contact tools and methods should leave no residue that may interfere with subsequent deposition efforts;

the deposition method may take any form and operate in any environment and that these may limit the combinations of deposit and inspection methods without detracting from the scope of the present teachings;

the materials used may cover the entire range of deposition and/or inspection technology capabilities;

inspection technologies may use the design files (e.g., 3D model, CAD file, STL file, g-code, etc.) for fabricating the part to aid in the interpretation of inspection data.

FIG. 1 depicts a real-time, in-situ system 100 for inspecting a part 102 while it is being produced by an additive manufacturing technique. The system includes an additive manufacturing apparatus 120; an automated exchangeable tool holder 106 carrying a tool 108 configured to deposit, add or weld layer-upon-layer of material to form the part 102. The tool holder 106 may comprise a rotary unit or hexapod unit for tool placement of the tool 108 as well as other tools 112, 114, 116 and 118. In some embodiments, the tool 108 is releasably connected to the tool holder 106, thereby enabling the tool to be detached and replaced. The tool holder 106 is mounted to a tool placement mechanism 110, which holds the tool holder 106 above or off to the side of a build table, tray or bed 122 of the AM apparatus 120. The tool placement mechanism 110 and AM apparatus 120 are configured to provide relative movement between the build tray and the tool holder. In particular, the tool holder and the build tray move relative to one another along paths defined by a build program 130 which may be uploaded and stored in a storage unit 132 of the system 100. In some embodiments, the build program 130 is embodied as a STL design file, CAD file, or g-code. The build program 130, on the other hand, may be created and set using the AM process (CNC) controller 134. Once an operator has created a build program using the CNC controller 134, it may be saved as a design file in the storage unit 132. The CNC controller 134 may be a processor or microprocessor. In other embodiments, the controller 134 may be a computer connected to the AM apparatus 120 via a communications cable (e.g., USB) or wireless communication.

The system 100 also includes an inspection tool 112 attached to the tool holder 106. The inspection device is configured to scan a layer of the feed material in situ and to detect defects in the layer once the layer is deposited, added or welded to a pre-existing layer of material. In some embodiments, the inspection tool 112 is configured to also collect property data (mechanical, electrical, thermal, porosity, density, crystallography or other salient properties) of the layer. The inspection tool 112 may be releasably connected to the tool holder 106. As shown in FIG. 1, the tool holder 106 can alternately position the tool 108 and the inspection device 112 in an orientation directed towards the build tray 122. Therefore, at one instance, the tool holder fixes the tool in a position for depositing, adding or welding a layer of material (AM step) and thereafter, in another instance, the tool holder switches the tool 108 with the inspection tool 112 into a position for scanning and detecting defects in the layer of the material (inspection step).

The inspection tool 112 may utilize electromagnetic testing sensors to determine if there is a defect in a layer of material. For example, the inspection tool 112 may comprise at least one eddy current probe that makes use of electromagnetic induction to detect and characterize surface flaws in the layer of material. Other examples of electromagnetic testing sensors which may be used in the system 100 include remote field testing probes, magnetic flux leakage tools, magnetic particle inspection tools, and alternating current field measurement tools. In other embodiments, the inspection tool 112 may provide spectral testing, such as visual imaging, non-visual imaging, spectroscopy, x-ray imaging, magnetic resonance imaging, or the like. In further embodiments, the inspection tool 112 may comprise acoustic-based test sensors, which utilize ultrasound, infrasound, or the like to perform non-destructive testing on the layer of material. Examples of acoustic-based test sensors are acoustic emission tools, electromagnetic acoustic transducers, and acoustic resonance technology. The above listing of non-destructive test sensors is offered as examples, and the inspection tool is not limited thereto. The kind of non-destructive testing sensor embodied by the inspection tool may depend on the kind of material being used in the AM process to build the part 102. For example, where the feed material is a metal or is metallic, an eddy current probe or ultrasonic sensor would be an effective tool for detecting defects, as they provide sufficient depth of penetration.

As shown in FIG. 1, the tool holder 106 may be configured to securely hold the inspection device 112 and the depositing/adding/welding tool 108, as well as one or more other tools or devices 114-118. For example, a cutting/milling tool 114 may be releasably connected to the tool holder 106 via a spindle. The spindle is adapted to receive the cutter 114, wherein the spindle is mounted to the tool holder 106. The cutter is configured to cut or mill at least a portion of the layer of material where a defect is detected. That is, in some embodiments, once a defect is detected, the tool holder switches the inspection tool with the cutter into a working position directed towards the build tray 122 so that the cutter can remove the portion of the layer where the defect is located. In other embodiments, the layer is completely analyzed and all defects present in the layer are detected before the system switches the inspection device 112 with the cutter 114. All of the defects are then excised by the cutter in one continuous removal process.

In some embodiments, the tool holder may also carry other inspection tools 116 in order to provide more comprehensive examination of the layer. The inspection tool 116 may differ from the inspection tool 112 based on the type of sensor used. However, the inspection tools 112 and 116 may be based on different non-destructive techniques, i.e., electromagnetic, spectral, acoustic. Other AM tools 118 (in addition to the depositing/adding/welding tool 108) may be inserted into the tool holder 106 in order to provide multiple AM processes/techniques that can be used in building the part 102. Alternatively, the tool 108 is configured to attach or embed an RFID tag to the part 102. The RFID tag would contain information concerning the material property data collected by the inspection tool 112. In some embodiments, one or more of the tools 112-118 may be releasably attached to the tool holder 106.

Figure 6C:
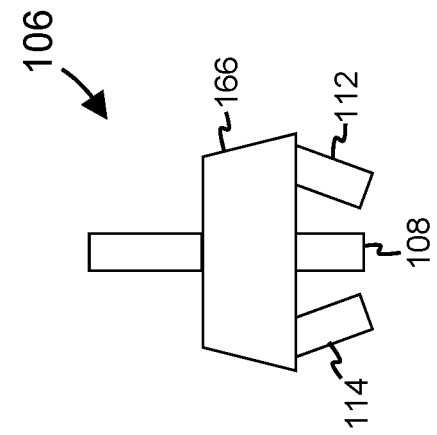
FIGS. 6a-6c show different embodiments of a tool holder of the AM inspection system shown in FIG. 1.
Figure 6B:
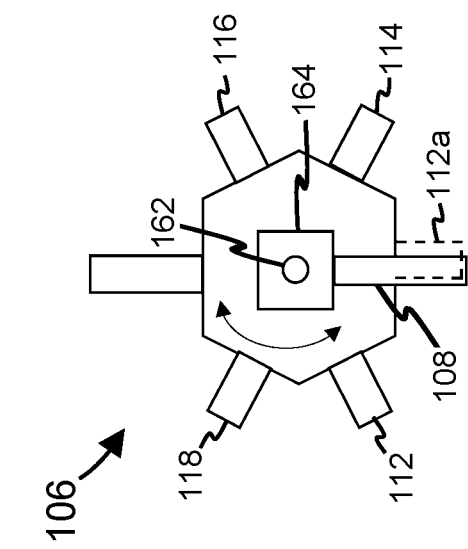
Figure 6A:
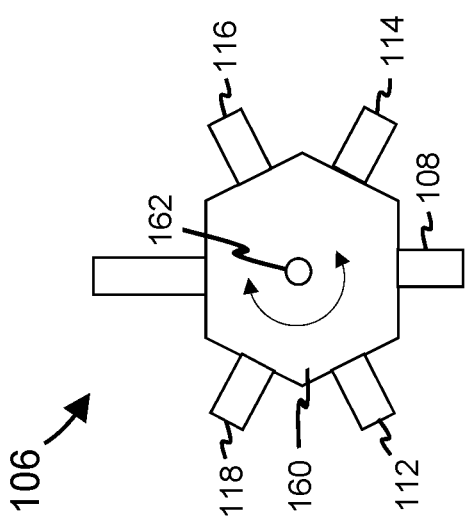

FIGS. 6a-6c show different configurations of the tool holder 106. The tool holder of FIG. 6a (also shown in FIGS. 1-3) is configured with a rotary hub 160, to which the tools 108, 112, 114, 116, 118 are releasably attached. The rotary hub may contain a servo motor or actuator 162 to change which tool is placed into a working position, wherein the working position is defined as a substantially vertical orientation directed towards the build tray 122. FIG. 6a shows the tool 108 is currently placed in the working position. In order for the inspection tool 112 to be placed in the working position, the motor 162 rotates the rotary hub 160 by, for example, approximately 60 degrees in a counterclockwise direction. Alternatively, in order for the cutting/milling tool 114 to be placed in the working position, the rotary hub may rotate in a clockwise direction, thereby displacing the tool 108 by 60 degrees. In some embodiments, the motor 162 is adapted to rotate the rotary hub 160 by 360 degrees or more.

FIG. 6b shows the tool holder 106 comprising a rotary hub 160 as well as a stationary hub 164, which is disposed adjacent to the rotary hub 160. When the motor 162 rotates the rotary hub 160, the stationary hub remains still and holds the tool attached thereto in the same position and orientation (i.e., working position). As shown in FIG. 6b, the depositing/adding/welding tool 108 is attached to the stationary hub 164, while the inspection tool 112, cutting/milling tool 114, and other tools 116-118 are attached to the rotary hub 160. This configuration enables the depositing/adding/welding tool 108 to be fixed in the working position at all times, and further enables the rotary hub 160 to also arrange one of the inspection tool 112, cutting/milling tool 114, or other tools 116-118 to be placed in the working position (i.e., in a substantially vertical orientation directed towards the build tray 122). As shown for example in FIG. 6b, the depositing/adding/welding tool 108 and the inspection tool 112a are arranged side-by-side, proximate, and/or adjacent to each other. A person of ordinary skill in the art would appreciate that a different tool other than the depositing/adding/welding tool 108 may be held by the stationary hub 164. In one embodiment, the inspection tool 112 may be attached to the stationary 164 so that inspection capabilities are available at all times and inspection can be performed continuously or periodically without having to rearrange the inspection tool into the working position. When both the inspection tool 112 and the depositing/adding/welding tool 108 are placed side-by-side in the working position, the inspection tool is configured to inspect the recently-added layer of material for any defects. Similarly, when the rotary hub 160 rotates the cutter 114 into the working position so that it is next to the inspection tool, the inspection tool can inspect the part 102 immediately after a layer of material or a portion thereof has been removed due to a defect(s). This helps to check that the removal process did not inadvertently damage or cause additional defects in the part 102, especially in any layer of material that is exposed as a result of the removal process. In another instance, the inspection tool 112 (on the stationary hub 164) and the inspection tool 116 (on the rotary hub 160) are both arranged side-by-side in the working position. Both inspection tools can therefore be operated simultaneously to efficiently provide a more comprehensive examination without increasing build time substantially.

FIG. 6c shows a third configuration of the tool holder 106, which comprises only a stationary hub 166. The depositing/adding/welding tool 108, inspection tool 112, cutting/milling tool 114, and other tools 116-118 are attached to the stationary hub. In FIG. 6c, the tools 116-118 are not shown for purpose of simplicity of illustration. All of the tools are secured to the stationary hub in working positions or substantially working positions. The depositing/adding/welding tool 108 is held in a vertical orientation directed towards the build tray 122. The inspection tool 112, cutting/milling tool 114, and tools 116-118, on the other hand, are held at a diagonal orientation (i.e., forming an oblique angle relative to the stationary hub 166) such that they are directed substantially towards the same location on the build tray 122 and/or part 102 to which the depositing/adding/welding tool 108 is directed. A person of ordinary skill in the art would appreciate that a different tool other than the depositing/adding/welding tool 108 may be held in the vertical orientation at the center of the stationary hub 166.

Referring back to FIG. 1, the CNC controller 134 controls relative movement between the tool holder 106 and the build tray 122 according to the build program 130. In some embodiments, the tool placement mechanism 110 may comprise one or more actuators in order to move the tool holder along one or more axes (x, y, z). For instance, the tool placement mechanism 110 may have an actuator 126 to shift the tool holder 106 towards (down) or away (up) from the build tray 122 (z axis) in order to decrease or increase the distance between the tool(s) and the top-most layer of the part 102. In other embodiments, the tool placement mechanism may comprise a plurality of tracks 128 on which the actuator 124 is situated to provide movement of the tool holder 106 in the x and/or y directions. The actuators 124, 126 and tracks 128 of the tool placement mechanism help provide accurate movement of the tool holder 106 and accordingly, for example the inspection tool 112, relative to the part 102 so that inspection scanning may be performed according to predefined routes.

Alternatively, or in addition to motion that may be provided by the tool placement mechanism 110, the AM apparatus 120 may be configured to provide movement of the build tray 122. For example, the AM apparatus 120 may comprise one or more actuators 129 to move the build tray 122 along one or more axes (x, y, z). Thus, the actuator 129 may be configured to shift the build tray towards (up) or away (down) from the tool holder (z axis) in order to position the part 102 closer to or further from any of the tools 108, 112, 114, 116, 118. In some embodiments, the actuator 129 or a second actuator within the AM apparatus 120 may be configured to move the build tray 122 in the x direction. Further, the actuator 129 or another actuator may be configured to move the build tray 122 in the y direction. By means of the one or more actuators 129, the build tray 122 may be moved accurately relative to the tool holder 106 and in turn the tools 108, 112, 114, 116, 118.

In some embodiments, the tool placement mechanism 110 and the AM apparatus 120 each provide 3-axes range of motion in order to produce the relative movement between the tool holder 106 and the build tray 122. In other embodiments, either the tool placement mechanism 110 or the AM apparatus 120 provides the 3-axes range of motion. In yet other embodiments, the tool placement mechanism 110 may provide only 1-axis or 2-axes range of motion, while the AM apparatus provides range of motion in the remaining axis or axes. For example, the tool placement mechanism may be configured to move the tool holder in the z-axis direction and the AM apparatus is configured to move the build tray in the x-axis and y-axis directions. A person of ordinary skill in the art would appreciate that other permutations with respect to motion capabilities of the tool placement mechanism and the AM apparatus are possible.

The system 100 may further comprise an inspection controller 170 for controlling the inspection tool 112 and/or inspection tool 116 during inspection of a layer of material of the part 102. In particular, the inspection controller 170 may have an inspection program 172 which defines the path(s) used by the tool placement mechanism and/or the AM apparatus to produce relative movement between the tool holder and the build tray during the inspection process. The inspection program 172 may be based on the build program 130 and reflect characteristics of g-code, a STL design file or a CAD file. As shown in FIG. 1, the inspection program 172 may be uploaded and stored directly in the inspection controller 170. In other embodiments, the inspection program may be stored in the storage unit 132 and transmitted to the inspection controller 170. When the inspection tool 112 is placed in the working position by the tool holder, the CNC controller 134 may relinquish movement control of the tool placement mechanism and the AM apparatus to the inspection controller. In other embodiments, the inspection controller 170 transmits movement control signals to the tool placement mechanism and the AM apparatus via the CNC controller 134. The inspection controller 170 may be a processor or a microprocessor. In some embodiments, the CNC controller 143 and the inspection controller 170 are combined to form one single control module.

The inspection controller 170 may be a feedback controller having, for example, a PID architecture. In some cases, the inspection controller uses an adaptive control system or an intelligent control system which learns from the results (e.g., number of defects, location of defects within the AM part) of each inspection run and accordingly adapts the AM build process (adjust the build program 130) and/or the inspection process (adjust the inspection program 172) to eliminate, or at least reduce the likelihood of other defects being made during subsequent adding of layers. The inspection controller 170 may be configured to have the inspection tool 112 placed in the working position of the tool holder and probe every portion of a layer recently deposited, added, or welded by the tool 108. Once a defect is detected by the inspection tool 112, the inspection controller will identify the location of the defect in the part 102 and may save this information in the storage unit 132. In some embodiments, the inspection controller 170 may re-inspect this location using the same inspection tool 112 to verify that indeed a defect is present. Alternatively, or in addition, the inspection controller 170 may arrange the other inspection tool 116 in the working position and use it to inspect the location to confirm the presence of a defect. Once there is confirmation that a defect(s) is present, either the inspection controller 170 or the CNC controller 134 adjusts the tool holder 106 so that the cutting/milling tool 114 is in the working position and directed towards the location of the defect. Thereafter, the defect is removed or the entire layer of material is removed. Upon the removal process being completed, either the gap is re-filled or a new replacement layer is deposited, added or welded by the tool 108. The inspection program performs another inspection of the layer of material to check that the correction eliminated the defect. If the defect still remains or other defects arise, then the system 100 performs the removal and re-fill process again until no defects are detected. Once the layer of material is free of defects, the build process continues with fabricating the next layer of the part 102.

The inspection controller 170, in other embodiments, may be configured to first probe a layer of material in its entirety, by identifying all the defects that may be present in the layer and saving the location of each of the defects that are detected into the storage unit 132. After inspection of the entire layer via the tool 112 finishes, the inspection controller 170 may verify the presence of defects using the same inspection tool 112 and/or the other inspection tool 116. Only after the entire layer has been inspected will the removal process and re-filling process be initiated. In particular, the inspection controller 170 and/or the CNC controller 134 accesses the storage unit 132 and retrieves the location data of detected defects in order to properly position the cutter 114 for removing the defects. The controllers 134 and 170 are in communication with the AM apparatus 120, tool holder 106, and tool placement mechanism 110 to provide precise movement of the tools and devices involved in the inspection system.

Figure 2:
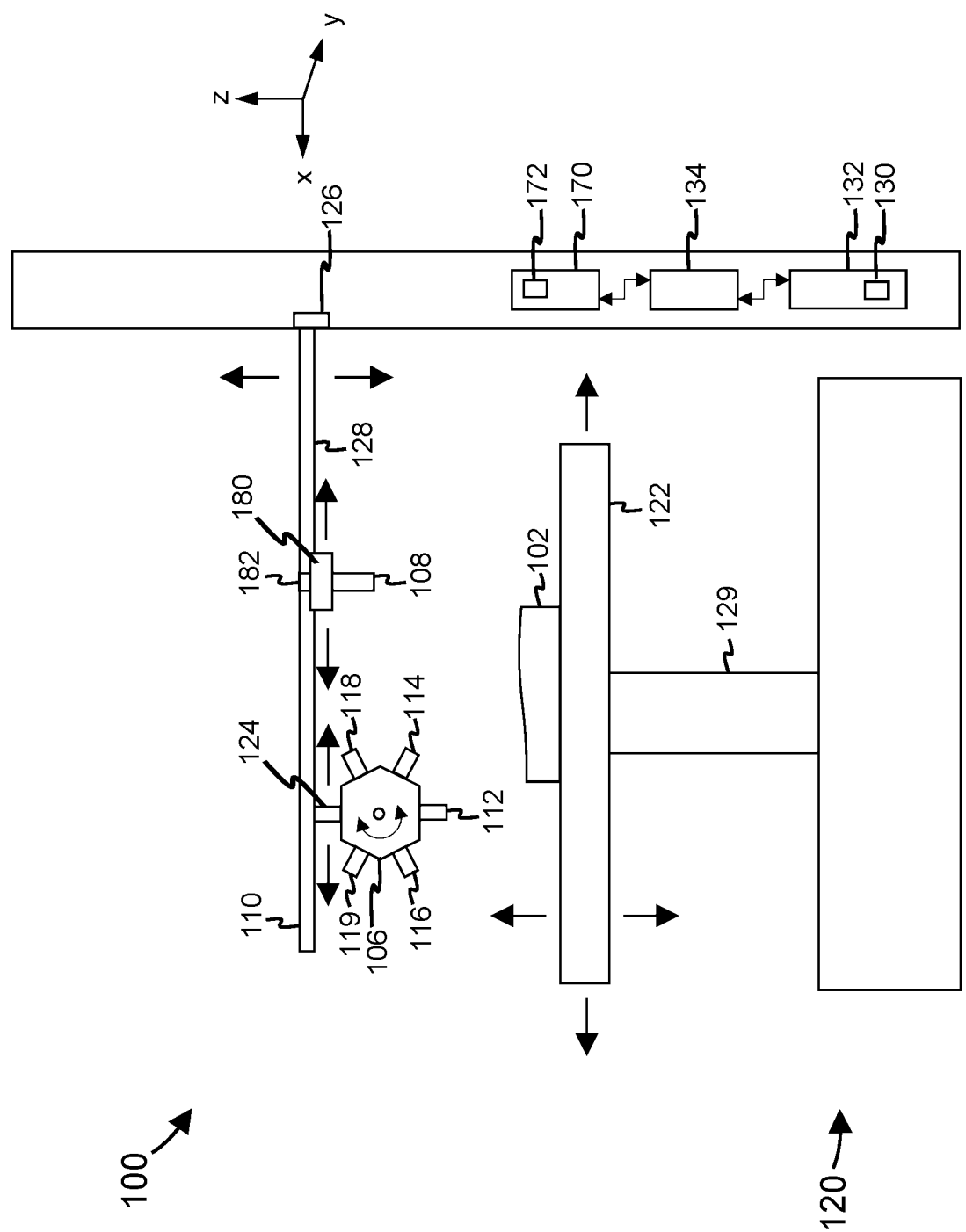
FIG. 2 is a schematic view of an AM inspection system configured for a manufacturing machine (e.g., additive, subtractive/milling, injection molded, or combination thereof) in accordance with the present teachings.

FIG. 2 shows another embodiment of the present teachings wherein the depositing/adding/welding tool 108 is separately mounted to the tool placement mechanism 110 (e.g., tracks 128) via a mount 180. The tool holder 106 may carry a first inspection tool 112, cutter 114, a second inspection tool 116, an RFID tag tool 118, and/or auxiliary tool 119 (e.g., inspection tool, cutter, AM tool). The mount 180 includes an actuator 182 which cooperates with the tracks 128 to move the mount 180 independently of movement of the tool holder 106. Like the tool holder 106, the mount 180 and tool placement mechanism 110 may be configured to provide range of motion along one, two or three axes in order to achieve relative motion between the tool 108 and the build tray 122 (and part 102). Movement of the actuator 182 may be controlled by the CNC controller 132 while movement of the tool holder 106 is controlled by the inspection controller 170. It is to be understood that the present teachings cover other variations in the attachment of the depositing/adding/welding tool, inspection device(s) and cutting/milling tool. For example, the cutter 114 may be separately mounted from the depositing tool 108 and inspection tools 112, 114.

Figure 3:
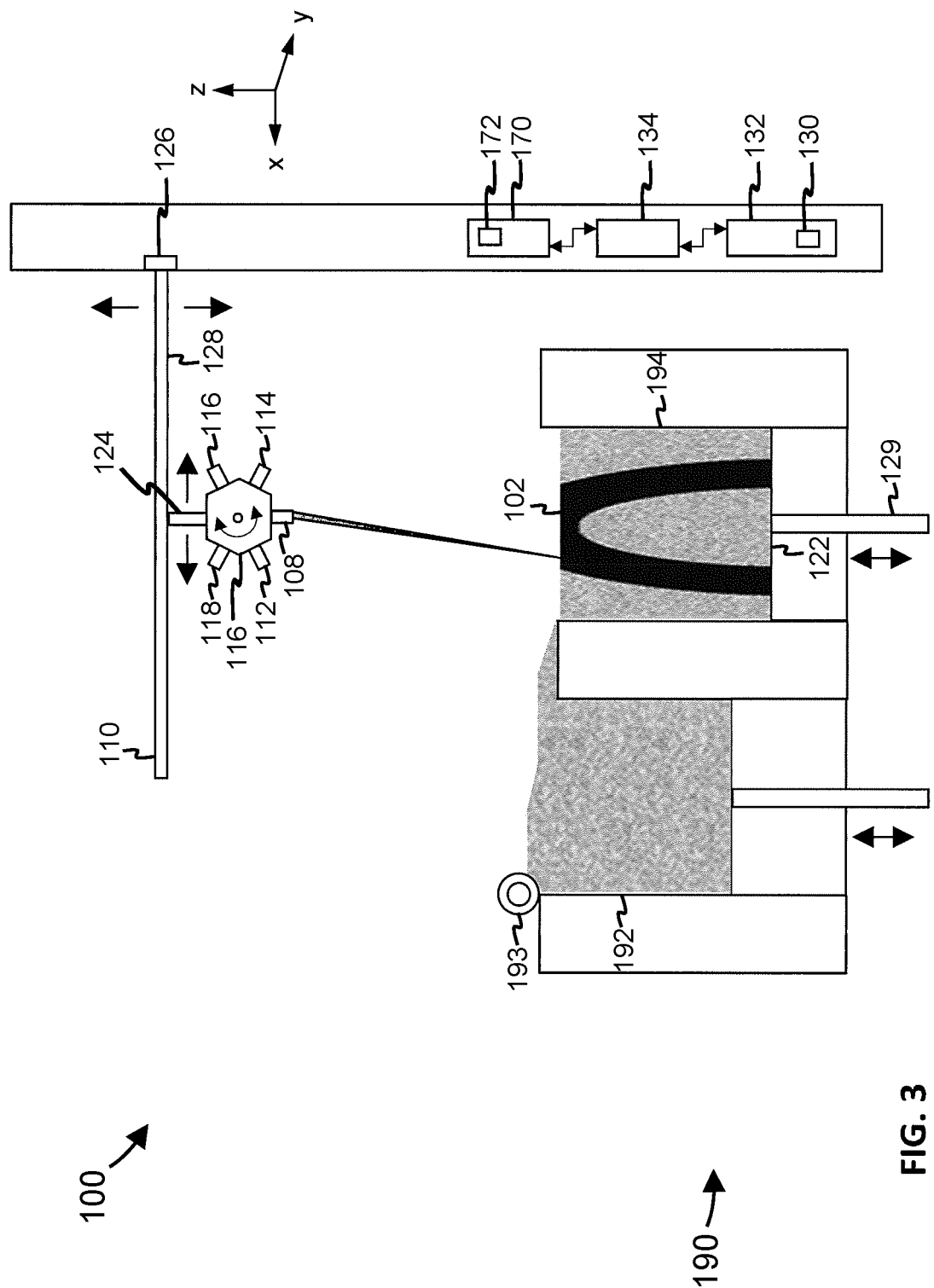
FIG. 3 is a schematic view of the AM inspection system shown in FIG. 1 configured for a laser sintering machine.

FIG. 3 shows the real-time, in-situ system 100, wherein the AM apparatus is a laser sintering (e.g., selective laser sintering) machine 190. The selective laser sintering (SLS) machine 190 comprises at least two chambers, a powder feed chamber 192 and a build chamber 194. The powder feed chamber contains the base or feed material from which the part 102 is fabricated within the build chamber 194. A layer of powdered material is laid down by a roller 193 on the build tray 122 in the area of the build chamber 194. In this particular configuration, the depositing/adding/welding tool 108 is a laser adapted to sinter a layer of the feed material to form a cross-section of the part 102. Depending on the inspection program 172, the recently-added layer is inspected by the inspection tool 112. If any defects are detected in the layer, a removal process and subsequent re-filling process is conducted. Thereafter, another inspection is performed to ensure that the correction eliminated the defect. If the re-inspection shows that no defects are present in the layer, then the build tray 122 is lowered by the actuator 129 (e.g., build piston) by a certain distance and the laser sintering process is repeated.

It will be appreciated that the real-time, in-situ inspection system 100 can be configured for other types of AM machines. For example, the AM apparatus 120 may be characterized as a fused deposition modeling printer. In another example, the AM apparatus 120 may comprise an ultrasonic welding system, wherein high-frequency ultrasonic acoustic vibrations are applied to layers of material or workpieces held together under pressure to create a solid-state weld. The AM apparatus 120 in other instances may be based on electron beam wire feed technology or additive friction stir technology. The above listing of additive manufacturing technologies is offered as examples, and the AM apparatus is not limited thereto.

Figure 4:
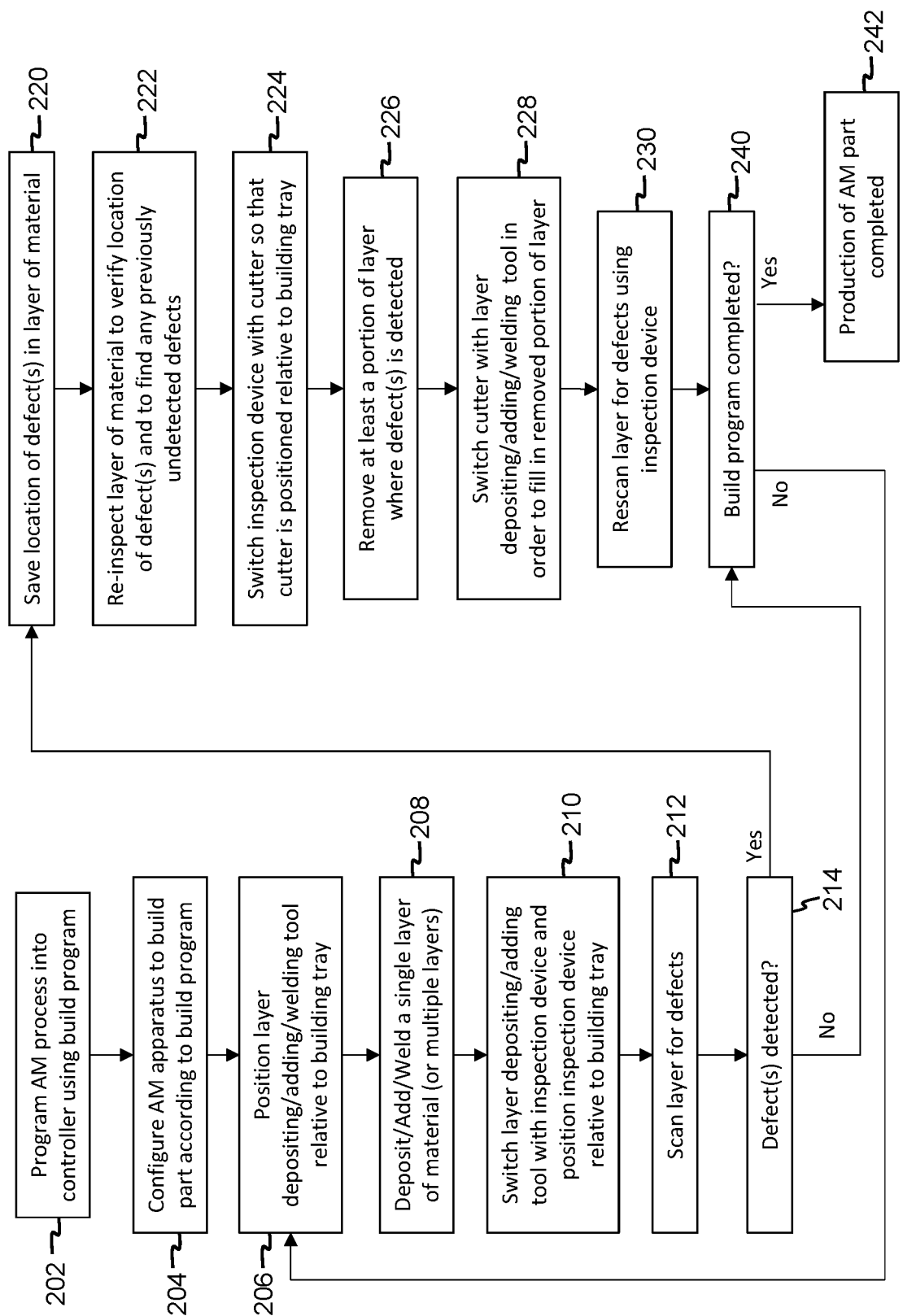
FIG. 4 is a flow diagram showing the steps of an AM inspection method in accordance with the present teachings.

FIG. 4 shows various steps involved in a corresponding AM inspection method. The method can be embodied in software or control algorithms stored and running on the CNC controller 134 and/or inspection controller 170 (note, in some embodiments, the controller 134 and 170 are combined as one single controller). For example, the method can be stored in the build program 130 and/or the inspection program 172, or alternatively, certain portions of the method are stored in the build program 130 while remaining portions are stored in the inspection program 172. In FIG. 4, the method of inspecting an AM build process comprises the following steps of: programming an AM build process within the controller 134 using a build program 130 (step 202); configuring the AM apparatus 120 to fabricate the part 102 according to the build program 130 (step 204); and positioning the depositing/adding/welding tool 108 relative to the build tray 122 to begin construction of a cross-section of the part 102 (step 206). The positioning step may comprise the steps of adjusting (e.g., rotating) the tool holder 106 so that the depositing/adding/welding tool 108 is in the working position (i.e., substantially vertical orientation directed towards the build tray); and providing relative movement between the tool holder 106 and the build tray 122. The relative movement may be achieved by moving the tool holder via tool placement mechanism 110 (with actuators 124, 126 and tracks 128) and/or moving the build tray via the actuator 129 in the AM apparatus 120. The method further comprises the steps of: depositing, adding, and/or welding a single layer of feed material or a group of layers, depending on the inspection configuration (step 208); and switching the depositing/adding/welding tool 108 with the inspection tool 112 and positioning the inspection tool relative to the recently-added layer of material (step 210). The switching step is performed by adjusting (e.g., rotating) the tool holder 106 so that the inspection tool 112 is in the working position. Thereafter, relative movement between the inspection tool and the layer of material is provided while the inspection tool scans the layer for defect or flaws (step 212). The method further comprises a determination step (step 214) to determine if a defect is detected along any portion of the layer being scanned. If no defect is present, the method proceeds to determine if the building process is completed (step 240). If the build program 130 has no additional building instructions, then it is determined that the AM process has finished fabricating the part 102 (step 242). In contrast, if the build program 130 contains further building instructions, the building process continues and steps 206-214 are repeated.

Referring back to step 214 of the method, if one or more defects are detected, the exact locations (x, y, z coordinates) of the defects are saved in the inspection controller 170 and/or the storage unit 132 (step 220). In some embodiments, the method may comprise a re-inspection step (step 222) to verify the presence of the defects. For example, the same inspection tool 112 may be used again to scan the entire layer of material to confirm that defects are indeed present at the saved locations or to determine if there are other defects previously undetected. Alternatively, or in addition thereto, the re-inspection may comprise switching the inspection tool 112 with another, different inspection tool 116 (i.e., arranging the inspection tool 116 in the working position) and scanning for defects. If any new defects are discovered during the re-scan, their locations are saved in the inspection controller 170 and/or the storage unit 132. The method continues with the steps of: switching the inspection tool 112 or 116 with the cutter 114 and positioning the cutter relative to the recently-added layer of material based on the saved location of a defect (step 224); removing at least a portion of the layer of material where the defect is located (step 226); switching the cutter 114 with the depositing/adding/welding tool 108 and patching or filling in the removed portion of the layer (step 228); and re-scanning the layer of material after the re-fill step has completed to determine that there are no defects (step 230). In some embodiments, steps 224-228 may be performed after each defect is detected (step 214). In other embodiments, steps 224-226 may be performed after a layer of material is scanned in its entirety and all possible defects are found. Accordingly, the cutter is positioned at each saved location and removes a portion of the layer in succession. Thereafter, step 228 is performed so that all of the portions of the layer that have been removed are refilled in succession, or in the case of the entire layer being removed, a replacement layer is deposited, added or welded. In yet other embodiments, steps 224-228 are performed for each location of a defect in succession. Thus, the process of removing and replacing a portion of the layer at one saved location is finished before moving on to the next saved location.

After the layer removal and replacement processes are completed and the rescanning step (step 230) shows that no defects are present, the method continues with step 240, wherein it is determined whether the building process is completed. In some embodiments of the method, if no defects are detected at step 214, a rescanning step may be conducted prior to determining if the building process is completed (step 240). Such a re-scanning step would be similar to step 222, and serve as a means of verifying no defects are present in the layer of material.

FIG. 5 shows an exemplary embodiment of the AM inspection system where the inspection tool 112 is an eddy current probe. At stage a, an alternating current flowing through the coil at a chosen frequency generate a magnetic field coil around the coil. Thereafter, when the coil is placed close to an electrically conductive material (e.g., layer of material of the part 102) in stage b, an eddy current is induced in the material. If a flow in the conductive material disturbs the eddy current circulation, the magnetic coupling with the probe is changed and a defect signal can be ready by measuring the coil impedance variation, as shown in stage c of FIG. 5.

It should be apparent from the foregoing detailed description that the objects set forth hereinabove have been successfully achieved. Moreover, while there is shown and described present preferred embodiments of the invention it is to be understood that the invention is not limited thereto but may be otherwise variously embodied and practiced within the scope of the following claims. That is, while the present teachings have been described above in terms of specific embodiments, it is to be understood that they are not limited to those disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. An inspection system for inspecting a part while said part is being produced by an additive manufacturing technique, said system comprising:
   an additive manufacturing apparatus having a build tray, said additive manufacturing apparatus being configured to fabricate said part layer-by-layer on said build tray;
   an automated tool holder carrying a tool configured to deposit, add or weld layer-upon-layer of material to form a cross-section of said part;
   said tool holder and said build tray being configured to move relative to one another along a path defined by a build program; and
   an inspection device comprising an eddy current probe attached to said tool holder, said inspection device configured to scan a layer of said material in situ and detect defects in said layer once said layer is deposited, added or welded; and
   wherein said tool holder alternately arranges said tool and said inspection device in a working position for use such that said tool holder fixes said tool in the working position for depositing, adding, or welding said layer of said material and thereafter said tool holder switches said tool with said inspection device into said working position for scanning and detecting defects in said layer of said material;
   wherein the tool and the inspection device are both attached to the holder at the same time.

2. The system of claim 1, further comprising an actuator on which the tool holder is mounted, wherein the actuator is positioned above the build tray of the additive manufacturing apparatus.

3. The system of claim 2, wherein the actuator moves the tool holder along at least one axis in a three-dimensional space.

4. The system of claim 3, wherein the actuator includes a plurality of tracks defining movement along said at least one axis, the tool holder being connected to said tracks and configured to move along said tracks via said at least one actuator.

5. The system of claim 1, wherein the additive manufacturing apparatus includes at least one actuator, said at least one actuator moves the build tray in at least one axis in a three-dimensional space.

6. The system of claim 1, wherein said inspection device is configured to provide non-contact, non-destructive testing of said layer of said material being scanned.

7. The system of claim 1, wherein said inspection device is configured to provide contact-based non-destructive testing of said layer of said material being scanned.

8. The system of claim 1, wherein said inspection device comprises an electromagnetic inspection method.

9. The system of claim 8, wherein said inspection device comprises an eddy current probe.

10. The system of claim 1, wherein said tool holder comprises a rotary hub and wherein the rotary hub rotates to alternatively to arrange the inspection device and the tool in the working position.

11. The system of claim 10, wherein said inspection device comprises a spectroscope.

12. The system of claim 1, wherein said inspection device comprises an acoustic inspection sensor.

13. The system of claim 12, wherein said inspection device comprises an ultrasonic transducer.

14. The system of claim 1, further comprises a spectral imager mounted to said tool holder, said spectral imager being alternately arranged with the tool and said inspection device, wherein said spectral imager device disposed in the working position is configured to scan said layer of said material in situ and detects defects in said layer.

15. The system of claim 1, further comprising a cutter mounted on said tool holder, said cutter is configured to cut or mill at least a portion of said layer of said material where a defect is detected.

16. The system of claim 15, wherein upon said defect being detected by said inspection device, said tool holder arranges said cutter in the working position so that said cutter removes said portion of said layer where the defect is located.

17. The system of claim 16, wherein after removal of said portion of said layer is completed, said tool holder switches said cutter with said tool so that said tool is disposed in the working position, said tool being configured to deposit, add, or weld additional material within the removed portion to patch said layer.

18. The system of claim 16, wherein said cutter removes an entirety of said layer of said material; and
wherein said tool holder switches said cutter with said tool so that said tool is disposed in the working position, said tool being configured to deposit, add or weld said material to form a replacement layer.

19. The system of claim 15, wherein said inspection device scans an entirety of said layer of said material and is configured to detect defects in said entirety of said layer, and only then, said tool holder switches said inspection device with said cutter so that said cutter is disposed in the working position, and said cutter removes all portions of said layer of said material where said defects are located.

20. The system of claim 15, further comprising a storage unit to save location data of each defect detected by the inspection device, said cutter using said location data to remove all portions of said layer of said material corresponding to said location data.

21. The system of claim 1, further comprising an inspection controller connected to said tool holder, said controller controlling said tool holder to alternately provide said tool and said inspection in said working position;
wherein said controller controls relative movement between said tool holder and said build tray along a pre-programmed path during inspection by the inspection device.

22. A method of inspecting a part while said part is being produced by
an additive manufacturing technique, said method comprising the steps of:
using an inspection system, which includes:
an additive manufacturing apparatus having a build tray, said additive manufacturing apparatus being configured to fabricate said part layer-by-layer on said build tray;
an automated tool holder carrying a tool configured to deposit, add or weld layer-upon-layer of material to form a cross-section of said part;
said tool holder and said build tray being configured to move relative to one another along a path defined by a build program; and
an inspection device comprising an eddy current probe attached to said tool holder, said inspection device configured to scan a layer of said material in situ and detect defects in said layer once said layer is deposited, added or welded; and
wherein said tool holder alternately arranges said tool and said inspection device in a working position for use;
arranging said tool in said working position to deposit, add or weld at least one layer of said material to form a cross-section of said part;
switching said tool with said inspection device via said automated tool holder such that said inspection device is disposed in said working position;
providing relative movement between said tool holder and said build tray while scanning said at least one layer with said inspection device; and
detecting one or more defects in said at least one layer using said inspection device
wherein the tool and the inspection device are both attached to the holder at the same time.

23. The method of claim 22, wherein said inspection system comprises a cutter mounted on said tool holder, and wherein said method further comprises the step of using said cutter to cut at least a portion of said layer where said one or more defects are present.

* * * * *